Figure 1:
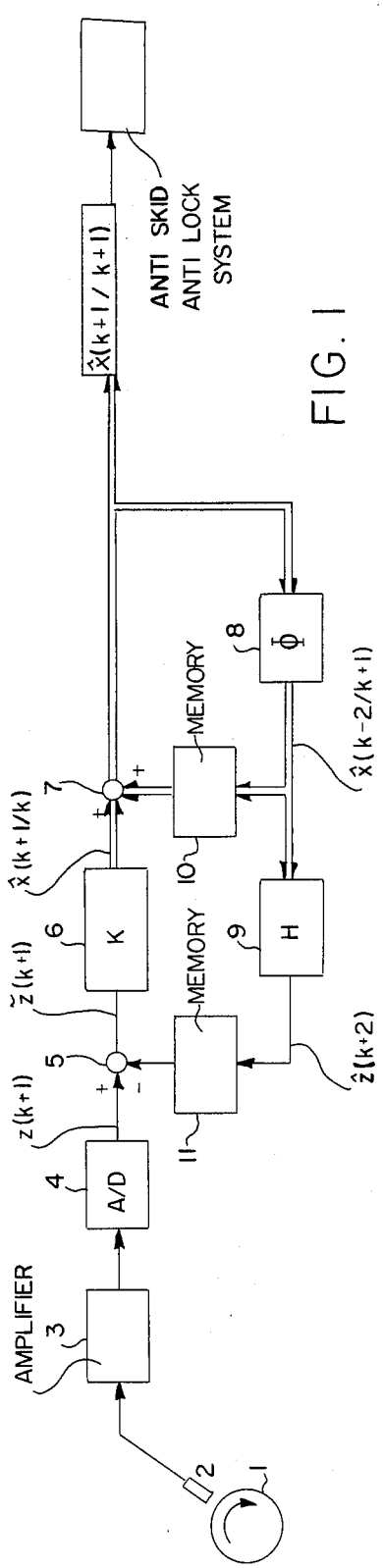

United States Patent [19]

van Zanten

[11] Patent Number: 4,764,871
[45] Date of Patent: Aug. 16, 1988

[54] METHOD FOR CONVERTING A ROTATIONAL SPEED TRANSDUCER OUTPUT SIGNAL INTO A LOW-DISTORTION SIGNAL

[75] Inventor: Anton van Zanten, Ditzingen, Fed. Rep. of Germany

[73] Assignee: Robert Bosch GmbH, Stuttgart, Fed. Rep. of Germany

[21] Appl. No.: 768,095
[22] PCT Filed: Dec. 15, 1984
[86] PCT No.: PCT/EP84/00404
§ 371 Date: Aug. 16, 1985
§ 102(e) Date: Aug. 16, 1985
[87] PCT Pub. No.: WO85/02591
PCT Pub. Date: Jun. 20, 1985

[30] Foreign Application Priority Data

Dec. 16, 1983 [DE] Fed. Rep. of Germany ....... 3345547

[51] Int. Cl.$^4$ ................................................ G01P 3/00
[52] U.S. Cl. .................................... 364/426; 364/565; 364/724; 180/179
[58] Field of Search ............... 364/426, 801, 151, 152, 364/578, 724, 431.07; 180/179, 170, 178; 303/109

[56] References Cited

U.S. PATENT DOCUMENTS

| | | | |
|---|---|---|---|
| 4,215,412 | 7/1980 | Bernier et al. | 364/551 |
| 4,335,432 | 6/1982 | Pue | 364/436 |
| 4,420,814 | 12/1983 | Arikawa et al. | 364/426 |
| 4,467,428 | 8/1984 | Caldwell | 364/426 |
| 4,489,382 | 12/1984 | Jonner et al. | 364/426 |
| 4,569,027 | 2/1986 | Nakano et al. | 364/426 |
| 4,577,260 | 3/1986 | Sugano et al. | 364/151 |

*Primary Examiner*—Parshotam S. Lall
*Assistant Examiner*—Thomas G. Black
*Attorney, Agent, or Firm*—Edwin E. Greigg

[57] ABSTRACT

A method is described for converting a sinusshaped output signal, which in its amplitude and frequency is dependent on a variable rotational speed that is to be ascertained, of a rotational speed transducer into a low-distortion signal. To this end, a Kalman filter is used in a certain manner.

6 Claims, 4 Drawing Sheets

ALTERNATING VOLTAGE AMPLITUDE $u_{ss}$ AS A FUNCTION OF ROTATIONAL WHEEL SPEED $\omega$ AND GAP DISTANCE $s$

METHOD FOR CONVERTING A ROTATIONAL SPEED TRANSDUCER OUTPUT SIGNAL INTO A LOW-DISTORTION SIGNAL

The invention relates to a method for converting a sinus-shaped output signal of a rotational speed transducer, the amplitude and frequency of which are dependent on a rotational speed that is to be detected and are subject to distortion, into a low-distortion signal.

In anti-skid systems, also known as anti-lock systems, the wheel speed must be detected. To this end, conventional systems typically use an electromagnetic measuring transducer, which comprises a gear ring and a pole pin. The gear ring is secured on the wheel and rotates with it. The pole pin is secured to the axle. An alternating voltage is induced at the pole pin when the wheel rotates. The frequency of the alternating voltage is determined by the wheel speed and by the number of teeth on the gear ring. If a tooth of the gear ring is located facing the pole pin, then the voltage is positive, and conversely, if a tooth gap is facing the pole pin, then the voltage is negative. This characteristic is utilized by measuring the time between two successive zero passages in opposite directions. This time is proportional to the wheel speed.

For measuring the time between zero passages, the alternating voltage is amplified and sent through a limiter, which limits the voltage at the top and bottom. The amplification factor is selected to be quite large, so that a rectangular signal is produced. The zero passages are then signalled by voltage jumps. To keep distortion in the alternating voltage from affecting the measurement, the amplifier input is provided with a hysteresis.

The amplitude of the alternating voltage is dependent not only on the wheel speed but also on the gap between the pole pin and the gear ring. The amplitude of the alternating voltage increases with the wheel speed and decreases as the gap increases. The information contained in the alternating voltage signal is partially erased by voltage limitation in the amplifier. The tolerances with which the sensor parts are manufactured are a problem. Because of this, the distances between the teeth of the gear ring are not exactly equal, and at high speed there can be large jumps in the calculated wheel speed. Specialized logical decisions which take physical principles into account, limit these jumps and thus filter the wheel speed. Distortion which just exceeds the input threshold of the amplifier is also a problem. If the frequency of the distortion is high, but not high enough to be recognized as distortion during the logical monitoring, then this distortion is included in the wheel speed calculation, which can cause incorrect functioning of the anti-skid regulating system.

The present invention discloses a method with which these problems can be screened out, or at least diminished. To this end, a statistical observer, known as a Kalman filter, is used. The main components of the filter are the simulation of the dynamic wheel rotation and the simulation of the alternating voltage signal of the sensor. By simulating the wheel rotation, the filter thus automatically includes the principles of physics. The amplified signal is no longer limited, so that not only the frequency but also the information contained in the amplitude of the signal are now advantageously evaluated. A more accurate speed signal is obtained than was possible with the conventional measuring method. As a result, greater tolerances in manufacturing the sensor elements can be accommodated. Also, tooth shapes other than the conventional one with a rectangular cross section, as well as quite different sensors having signals which can readily be mathematically simulated, can be used.

Furthermore, the subsequent calculation of wheel acceleration can also be eliminated, because this variable is also estimated by the Kalman filter. The method according to the invention can be realized with both analog and digital switching means.

Figure 5:
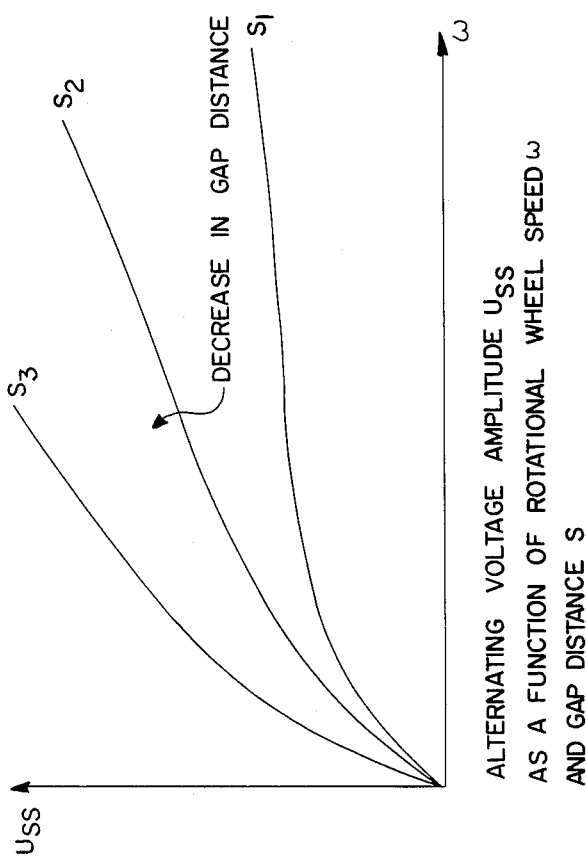
Figure 2:
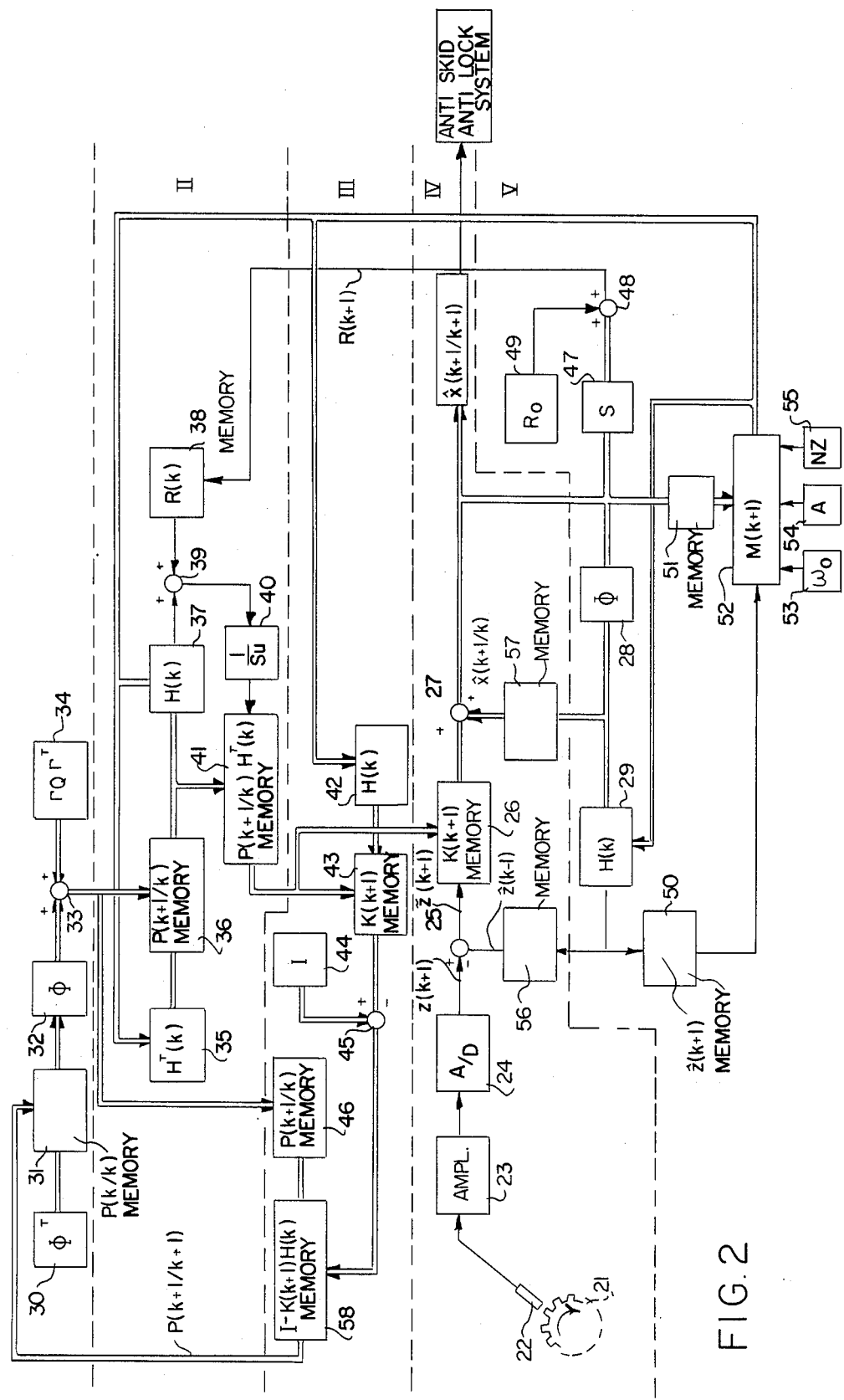
Figure 3:
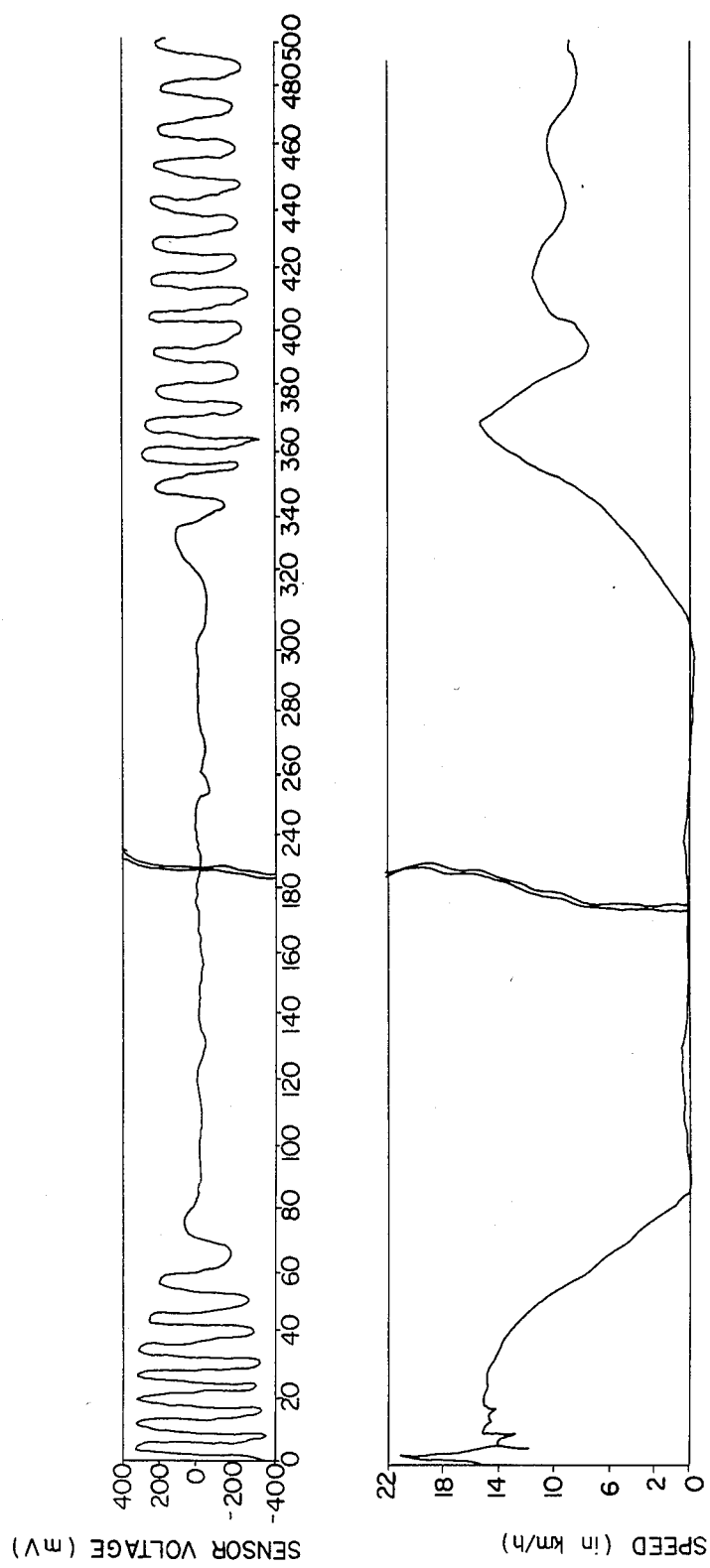
Figure 4:
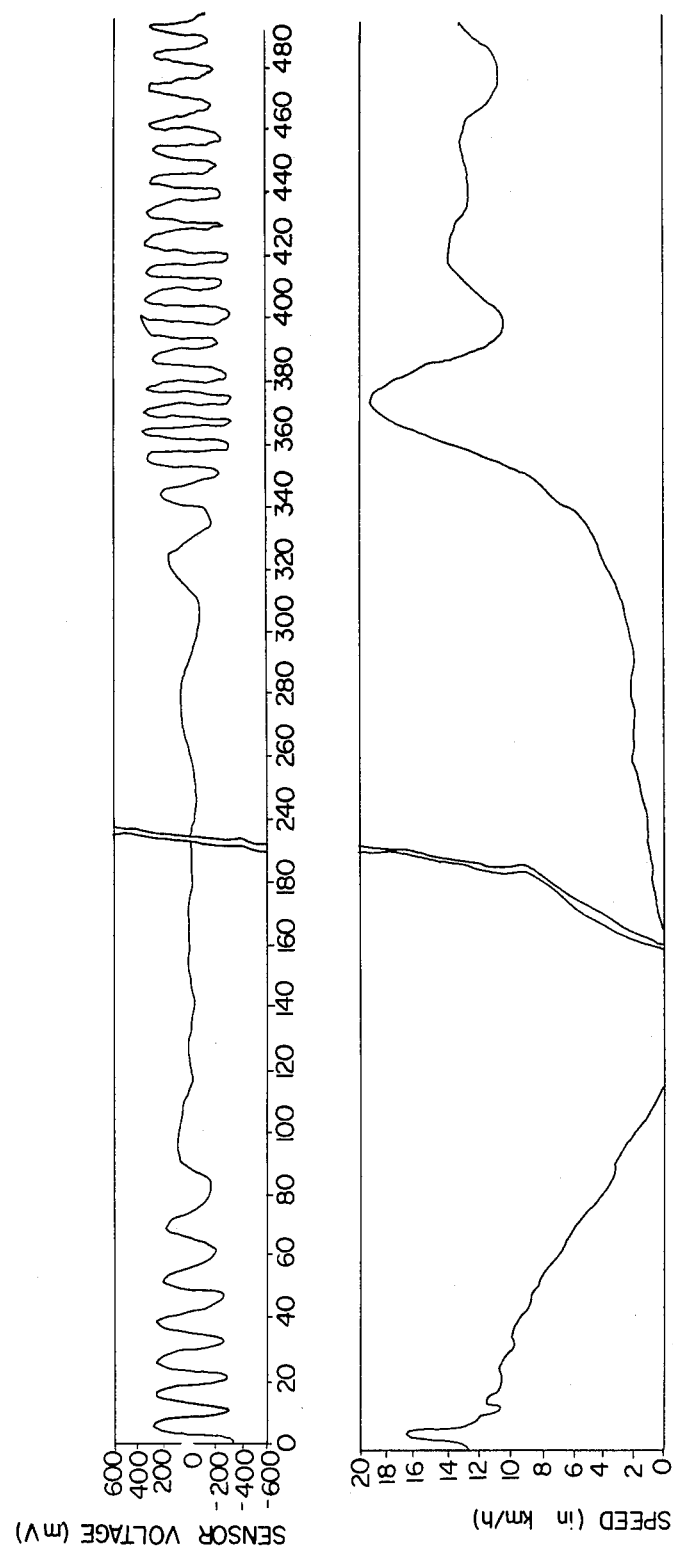

The invention will now be described in greater detail in terms of the exemplary embodiments illustrated in the drawings. Shown are:

FIG. 1, a first exemplary embodiment of the invention, based on a previously calculated constant Kalman amplification factor;

FIG. 2, an exemplary embodiment in which the Kalman amplification factor is recalculated continuously; and FIGS. 3-5, explanatory diagrams.

In FIG. 1, a sensor $\frac{1}{2}$ emits a voltage which here is assumed to be proportional to a wheel speed. This voltage is amplified in a block 3 and digitized in a converter 4. In the subtracter 5, a simulated measured signal $\hat{z}(k+1)$ is subtracted from the sensor signal $z(k+1)$ at the output of the converter 4. The difference signal $\tilde{z}(k+1)$ is multiplied in a block 6 with the Kalman amplification vector K. The product is the estimated error in the simulation of the system status, $\hat{x}(k+1/k)$. In an adder, this correction is added to the simulated system status $\hat{x}(k+1/k)$. The sum is the estimated system status $\hat{x}(k+1/k+1)$, that is, a signal which contains the measured value that is to be determined, but in a form having less distortion which signal is directed to the anti-skid-anti-lock system to prevent wheel slippage.

This estimated system status is multiplied by the transition matrix in block 8 and the product, $\hat{x}(k+2/k+1)$, is delivered to a memory 10. In block 9, this product is also multiplied by the measurement vector H, and the result, which is the estimated sensor signal $\hat{z}(k+2)$, is stored in a memory 11. Then the next cycle is begun.

Because of the assumed linear design of the sensor 1, 2, the amplification vector K can be assumed here to be constant and can be calculated in advance and stored in memory in block 6. This constant vector is assigned the asymptotic value of K(k), that is, $K = \lim_{n \to \infty} (K(n))$.

FIG. 2 shows another exemplary embodiment. The calculations here are divided into five segments I–V. These segments are indicated by horizintal broken lines in FIG. 2. The calculations begin in segment I and continue through segments II, III and IV to segment V. After segment V, segment I of the next cycle begins. Sensor elements, that is, a gear ring 21 and a pole pin 22, are schematically shown at bottom left in FIG. 2. The induced alternating voltage of the sensor is amplified in an amplifier 23 and digitized in a converter 24. This digitized alternating sensor voltage is now called the sensor signal, $z(k+1)$. In a subtracter 25, a simulated sensor signal $\hat{z}(k+1)$ from a memory 56 is subtracted from the sensor signal $z(k+1)$. This difference signal $\tilde{z}(k+1)$ is multiplied in a multiplier 26 by the Kalman amplification factor, which represents a vector $K(k+1)$. The output variable is a difference vector $\tilde{x}(k+1/k+1)$; this is a signal vector, which comprises a plurality of separate signals. In the adder 27, the simulated status vector $\hat{x}(k+1/k)$, which is the output of a memory 57, is added to the difference vector, and the estimated status of the wheel, $\hat{x}(k+1/k+1)$, is thereby formed. This signal contains the measured variable, with distortion eliminated, that is sought. By multiplying the estimated status by the measurement vector $H(k+1)$, the measurement signal corresponding to the distortion-free wheel speed is obtained.

The vector $K(k+1)$ is called the Kalman amplification. The amplification factors are time-dependent and are calculated in accordance with the distortion signals and measurement signals. Segments I–II and V serve to perform the time-dependent calculation of the variable Kalman amplification factors.

In segment I, $\Phi^T$, $\Phi$ and $\Gamma Q \Gamma^T$ are constant matrixes; $\Phi^T$ is the transposed matrix of $\Phi$. $P(k/k)$ is a variable matrix. $\Phi^T$, from a block 30, is multiplied by $P(k/k)$ (in block 31), and the product is then multiplied once again by $\Phi$ in block 32. The result is added in the adder 33 to the matrix $\Gamma Q \Gamma^T$ from block 34. The sum $P(k+1/k)$ is stored in memory in blocks 36 and 46. This completes the calculation in segment I.

In segment II, $H(k)$ and $P(k+1/k)H^T(k)$ are variable vectors, $P(k+1/k)$ is a variable matrix and $R(k)$ is a variable scalar. The vector $H^T(k)$ from block 35 is multiplied by the matrix $P((k+1/k)$ from block 36, and the result is stored in memory in block 41, as well as being multiplied by $H(k)$ in block 37. The output of block 37 is a scalar, which is added in adder 39 to the scalar $R(k)$ from block 18. In a block 40, the reciprocal of this sum $S_u$ is formed. The calculations in segment II are completed with the multiplication of the scalar reciprocals by the vector $P(k+1/k)H^T{}_k$ from block 41 and the storage of the product $K(k+1)$ in memory in blocks 43 and 26.

In segment III, I is a constant identity matrix; $P(k+1/k)$ and $I-K(k+1)H(k)$ are variable matrixes. $H(k)$ and $K(k+1)$ are variable vectors. The vector $H(k)$ from block 42 is multiplied with the vector $K(k+1)$ in block 43, and the product, which is a matrix, is subtracted in block 45 from the constant matrix I of block 44. The difference $I-K(k+1)H(k)$ is stored in a memory 58. Subsequently, the matrix $P(k+1/k)$ from block 46 is multiplied by this difference matrix in block 58, and the result $P(k+1/k+1)$ is stored in memory in block 31.

After the completion of the already-described calculations in segment IV, in segment V the estimated status $\hat{x}(k+1/k+1)$ is multiplied in block 47 by a vector S and the product, which is a scalar, is added in the adder 48 to the scalar $R_o$ of block 49. The sum $R(k+1)$ is stored in memory in block 38. The vector $H(k+1)$ is also calculated. To this end, the simulated sensor signal $\hat{z}(k+1)$ and the estimated status $\hat{x}(k+1/k+1)$ are used. The simulated sensor signal $\hat{z}(k+1)$ is stored in memory in a block 50. This signal is multiplied in block 52 by the vector $M(k+1)$. The vector $M(k+1)$ is calculated from the estimated status $\hat{x}(k+1/k+1)$, which is stored in the memory 51, and from the constant scalars $\omega_o$ (block 53), A (block 54) and NZ (block 55). The product is the new vector $H(k+1)$, which is stored in memory in block 29, 35, 57 and 42. The estimated status $\hat{x}(k+1/k+1)$ is also multiplied in block 28 by the transition matrix $\Phi$, which simulates the wheel behavior. The output is then the simulated wheel status $\hat{x}(k+2/k+1)$. In block 29, the simulated wheel status $\hat{x}(k+2/k+1)$ is multiplied by the measurement vector $H(k+1)$, in order to obtain the simulated sensor signal $\hat{z}(k+2)$ for the memories 50 and 56.

Only when the next cycle begins is the analog/digital converter 24 addressed and the new value of the sensor signal $z(k+2)$ stored. The frequency of the A/D converter must therefore be adapted to the calculation speed of the entire calculated value. However, in order to attain an acceptable number of pickup points within one signal period, the pickup frequency must be selected to be high enough. If it is assumed that the gear ring has 50 teeth and that the maximum speed of the wheel does not exceed 60 rpm, then the pickup frequency must be at least 6 kHz, so as to assure reliable function of the filter even at the highest speed. This means in turn that the computer must perform the calculations of one cycle within 0.16 milliseconds. The computer must be selected based on this criterion. At lower rpm and with a lesser number of gear teeth, the selected pickup frequency can be correspondingly lower.

In FIGS. 1 and 2, the connections between the blocks that are drawn with single lines represent single connections; those drawn with double lines represent multiple connections. The individual matrixes and vectors are listed in Appendix II on pages 17–19. The designations for the individual symbols used are provided in Appendix I.

EXAMPLES

Diagrams are provided in FIGS. 3 and 4. In both figures, the upper curve is the sensor voltage following the A/D converter; the digital values have been joined linearly. These curves are records of measurement. Below the sensor voltage, the circumferential edge speed as calculated by the Kalman filter is shown. FIG. 3 shows the result when the pickup rate is high, while FIG. 4 shows the result at a low pickup rate. In both calculations, $R1=0$ is selected in the vector S.

In the example of FIG. 3, the wheel locks between 90 and 300 milliseconds. The Kalman filter also indicates this quite satisfactorily. The pronounced fluctuation in the speed at the beginning of the filtering is the transient oscillation of the filter.

In the example of FIG. 4, the wheel locks between 110 and 210 milliseconds. Here again, the Kalman filter functions satisfactorily despite the low pickup rate.

Explanations of the calculations made by the Kalman filter follow. The estimated status of the system is:

$x_1$ = wheel angle of rotation
$x_2$ = rotational speed of wheel
$x_3$ = wheel torque
$x_4$ = reciprocal of the sensor gap distance The system equations are as follows:

$\dot{X}_1 = X2$
$\dot{X}_2 = X3/J$
$\dot{X}_3 = W1$
$\dot{X}_4 = W2$ where $W_1$ and $W_2$ are the noise level of the wheel torque and of the reciprocal of the sensor gap distance, respectively.

The discrete system solution is $$x(k+1) = \Phi(k+1/k) \cdot x(k) + \Gamma(k+1/k) \cdot W(k)$$

where $$w(k) = \begin{vmatrix} 0 \\ 0 \\ W_1(k) \\ W_2(k) \end{vmatrix}$$

The sensor signal is represented as follows:

$$z = x_4 \cdot \sin(x_1 \cdot NZ)(1 - e(x_2/w_o)(1 + Ax_2) + r(t)$$

where $r(t)$ is the distortion signal with the measured signal.

This equation describes the general course of the sensor voltage with a number of gear teeth NZ, the reciprocals of the gap distance $x_4$ and the rotational speed $x_2$. The dependency of the alternating voltage amplitude $U_{ss}$ as a function of the wheel speed $\omega$ and the gap distance s is shown in FIG. 5.

The discrete sensor signal is:

$$z(k+1) = H(k) \cdot x(k+1) + r(k)$$

The wheel acceleration b(k) becomes:

$$b(k) = x_3(k)/J$$

Thus it is possible, in a simple manner, to ascertain the wheel acceleration here as well.

ESTIMATION ALGORITHM

Covariance matrix:

$$P(k+1/k) = \Phi \cdot P(k/k) \cdot \Phi^T - \Gamma \cdot Q \cdot \Gamma^T$$

Kalman amplification:

$$K(k+1) = P(k+1/k) \cdot H^T(k) \cdot [H(k) \cdot P(k+1/k) \cdot H^T(k) + R(k)]^{-1}$$

Covariance matrix:

$$P(k+1/k+1) = [I - K(k+1) \cdot H(k)] \cdot P(k+1/k)$$

System status:

$$\hat{x}(k+1/k+1) = \Phi \cdot \hat{x}(k+1/k) + K(k+1/k) \cdot [z(k+1) - H(k) \cdot \Phi \cdot \hat{x}(k/k)]$$

APPENDIX I

Designations of the Variables Used

| | |
|---|---|
| T | cycle time |
| J | moment of inertia of regulated course (wheel) |
| $Q_1$ | variance of the moment |
| $Q_2$ | variance of reciprocals of gap distance |
| R | variance of sensor signal noise |
| $x_1$ | estimated status, angle of wheel rotation |
| $x_2$ | estimated status, rotational speed of wheel |
| $x_3$ | estimated status, wheel torque |
| $x_4$ | estimated status of reciprocal sensor gap distance |
| $R_o$ | basic variance of sensor signal noise |
| $W_o$ | sensor constant (ascertainable from FIG. 5) |
| A | sensor constant (ascertainable from FIG. 5) |
| NZ | number of teeth of sensor rotor |
| $R_1$ | sensor constant (speed-dependent variant of sensor signal noise |
| $P_1$ $P_2$ $P_3$ $P_4$ | initial variances of status variables |
| $W_1$ | noise level of wheel torque |
| $W_2$ | noise level of reciprocal of sensor gap distance |
| r(t) | distortion signal in measurement signal |
| b(k) | wheel acceleration |

The variances must be skillfully chosen.

APPENDIX II

(1) Contents of the Constant Blocks

In what follows, T is the cycle time, J the moment of inertia of the wheel about its axis, $Q_1$ the variance of the moment upon the wheel about the axis of the wheel, $Q_2$ is the variance of the reciprocal of the gap between the pole pin and gear ring of the sensor, R is the variance of the sensor signal noise, and $x_1 - x_4$ is the estimated status of the wheel. The superscript T for a matrix or a vector signifies the transposed matrix or vector (e.g., $\Phi^T$).

1.1: Transistor matrix $\Phi$ of the system $$\Phi = \begin{vmatrix} 1 & T & T/(2J) & 0 \\ 0 & 1 & T/J & 0 \\ 0 & 0 & 1 & 0 \\ 0 & 0 & 0 & 1 \end{vmatrix}$$

1.2: Matrix of block 34 ($\Gamma \cdot Q \cdot \Gamma^T$) is the result of $$\Gamma = \begin{vmatrix} T & T/(2J) & T/(6J) & 0 \\ 0 & T & T/(2J) & 0 \\ 0 & 0 & T & 0 \\ 0 & 0 & 0 & T \end{vmatrix}$$

$$Q = \begin{vmatrix} 0 & 0 & 0 & 0 \\ 0 & 0 & 0 & 0 \\ 0 & 0 & Q1 & 0 \\ 0 & 0 & 0 & Q2 \end{vmatrix}$$

1.3: Identity matrix I $$I = \begin{vmatrix} 1 & 0 & 0 & 0 \\ 0 & 1 & 0 & 0 \\ 0 & 0 & 1 & 0 \\ 0 & 0 & 0 & 1 \end{vmatrix}$$

1.4: Constants

Block (29): $R_o$ (basic variance of sensor signal noise)
Block (33): $W_o$ (sensor constant)
Block (34): A (sensor constant)
Block (35): NZ (number iof gear teeth)

1.5: Vector S $$S = \begin{vmatrix} 0 \\ R1 \\ 0 \\ 0 \end{vmatrix}$$

(2) Contents of the Variable Blocks 2.1 Transposed measurement vector $H^T$ $$H^T = \begin{vmatrix} NZ \cot(NZ \cdot x_1) \\ \dfrac{1}{\omega_o \cdot \left(e^{\frac{x_2}{\omega_o}} - 1\right)} + \dfrac{1}{1 + A\,x_2} \\ 0 \\ \dfrac{1}{x_4} \end{vmatrix}$$

2.2 Initial value of block 31

$$P(0/0) = \begin{vmatrix} P_1 & 0 & 0 & 0 \\ 0 & P_2 & 0 & 0 \\ 0 & 0 & P_3 & 0 \\ 0 & 0 & 0 & P_4 \end{vmatrix}$$

where $P_1 - P_4$ are the initial variances of the status variables.

I claim:

1. A method using a Kalman filter for converting a sinusoidal output signal of a rotational speed transducer, which in its frequency and amplitude is subject to distortion and is dependent on a varying rotational speed that is to be ascertained, into a low-distortion signal which signal is directed to an anti-skid-anti-lock system to prevent wheel slippage, which includes the steps of
   (a) forming at predetermined time intervals, a difference between an output signal ($z(k+1)$) of the speed transducer and a simulation value ($\hat{z}(k+1)$) ascertained in the Kalman filter based on a previous measurement;
   (b) converting this difference ($\tilde{z}(k+1)$) by multiplication with a Kalman amplification factor K, which represents a vector, into a difference vector $\hat{x}(k+1/k)$;
   (c) forming a sum $\hat{x}(k+1/k+1)$ of this difference vector $\hat{x}(k+1/k)$ and a simulation vector $\hat{x}(k+2)/k+1)$ and directing the sum $\hat{x}(k+1/k+1)$ to the anti-skid system to prevent wheel slippage;
   (d) storing this summed vector $\hat{x}(k+2/k+1)$, which contains the desired low-distortion signal, in a memory, after multiplication by a transition matrix $\Phi$, as a simualtion vector $\hat{x}(k+2/k+1)$ for the following sum formation;
   (e) and storing the simulation vector $\hat{x}(k+2/k+1)$, after multiplication by a measurement vector H, in memory as a simulation value $\hat{z}(k+2)$ for the following cycle, wherein the terms in parentheses (k+m) or (k+m/k+n) indicate that the corresponding variable is used in the evaluation cycle (k+m) and was obtained in the evaluation cycle (k+n).

2. A method as defined by claim 1, wherein said Kalman amplification factor is a previously calculated and constant vector.

3. A method as defined by claim 1, in which said Kalman amplification factor K(k+m) in each instance is ascertained in accordance with the following method:
   (a) multiplying a transposed transition matrix $\Phi^T$ by a covariance matrix P(k/k) obtained in the previous cycle, and multiplying this product by the transition matrix $\Phi$;
   (b) adding this product to a constant matrix $\Gamma Q \Gamma^T$, in order to obtain a prediction valve for a new covariance matrix P(k+1/k);
   (c) multiplying this prediction valve by the transposed variable measurement vector $H^T(k)$, storing the resultant vector $P(k+1/k)\cdot H^T(k)$ in memory and multiplying this vector by the measurement vector H(k);
   (d) adding the resultant scalar to a further variable scalar R(k) and forming the reciprocal of the resultant sum $S_u$;
   (e) multiplying the stored vector $P(k+1/k)\cdot H^T(k)$ by this reciprocal value, resulting in the Kalman amplification vector K(k+1);
   (f) multiplying this factor with the difference $\tilde{z}(k+1)$, on the one hand, and on the other by the variable measurement vector H(k);
   (g) subtracting the resultant product $K(k+1)\cdot H(k)$ from a constant matrix I;
   (h) multiplying this difference $I - K(k+1)\cdot H(k)$ by the prediction, obtained in accordance with step (b), for the covariance matrix P(k+1/k), and the product is made available, as the newly ascertained covariance matrix P(k+1/k+1), for the following cycle;
   (i) obtaining the variable scalar R(k+1) for the following cycle by multiplication of the simulation vector $\hat{x}(k+1/k)$ by a constant vector S and addition of a scalar $R_o$ to the scalar $\hat{x}(k+1/k+1)\cdot S$ obtained by the multiplication; and
   (k) obtaining the variable measurement vectors H(k+1) for the following cycle by multiplication of the ascertained simulation value $\hat{z}(k+1)$ with a vector M(k+1), wherein the vector M(k+1) results from an estimated status $\hat{x}(k+1/k+1)$ and constant scalars $\omega_o$, A and NZ.

4. A method as defined by claim 1, which includes ascertaining the wheel acceleration b(k) from the relationship $\hat{b}(k) = \hat{x}_3(k/k)/J$ wherein $x_3$ results from $\hat{x}(k/k)$.

5. A method as defined by claim 2 which includes ascertaining the wheel acceleration b(k) from the relationship $$\hat{b}(k) = \hat{x}_3(k/k)/J$$

wherein $x_3$ results from $\hat{x}(k/k)$.

6. A method as defined by claim 3 which includes ascertaining the wheel acceleration b(k) from the relationship $$\hat{b}(k) = \hat{x}_3(k/k)/J$$

wherein $x_3$ results from $\hat{x}(k/k)$.

* * * * *